Figure 1:
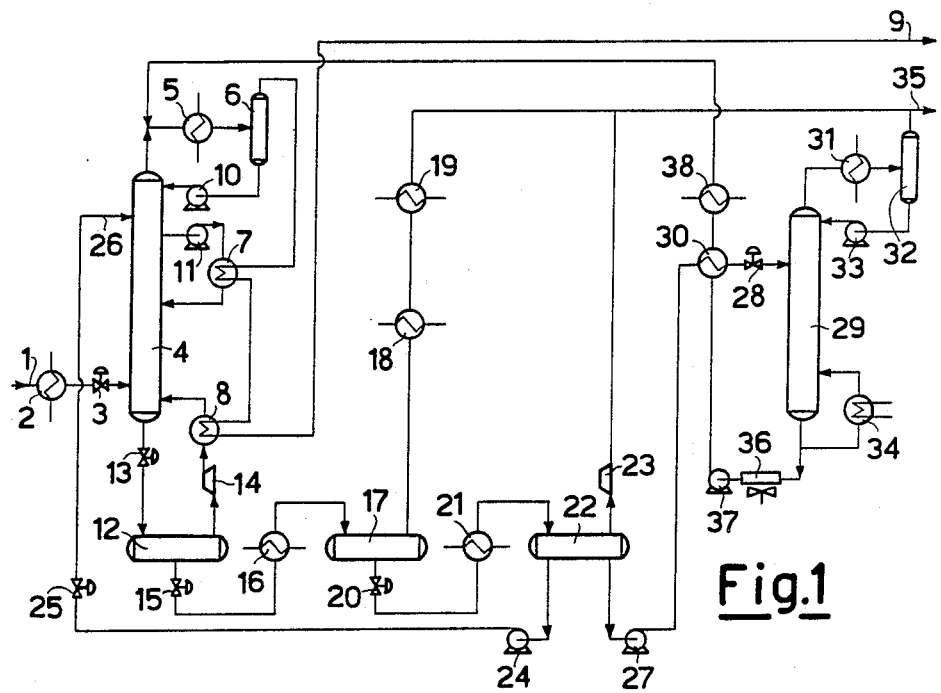

United States Patent [19]

Gazzi et al.

[11] Patent Number: 4,971,607
[45] Date of Patent: * Nov. 20, 1990

[54] CRYOGENIC PROCESS FOR THE REMOVAL OF ACIDIC GASES FROM MIXTURES OF GASES BY SOLVENT

[75] Inventors: Luigi Gazzi, Milan; Carlo Rescalli, San Donato Milanese, both of Italy

[73] Assignee: Snamprogetti S.P.A., Milan, Italy

[*] Notice: The portion of the term of this patent subsequent to Dec. 31, 2002 has been disclaimed.

[21] Appl. No.: 253,954

[22] Filed: Oct. 3, 1988

Related U.S. Application Data

[63] Continuation of Ser. No. 863,874, May 16, 1986, abandoned.

[30] Foreign Application Priority Data

May 24, 1985 [IT] Italy ................ 20888 A/85

[51] Int. Cl.$^5$ ............................................. B01D 47/00
[52] U.S. Cl. ........................................ 55/43; 55/48; 55/68; 55/73; 62/17
[58] Field of Search ................ 55/73, 43, 48, 68; 62/17

[56] References Cited

U.S. PATENT DOCUMENTS

| | | | |
|---|---|---|---|
| 2,781,863 | 2/1957 | Block et al. | 55/73 |
| 4,097,250 | 6/1978 | Pagani et al. | 55/48 |
| 4,305,733 | 12/1981 | Scholz et al. | 55/73 |
| 4,561,869 | 12/1985 | Gazzi et al. | 62/17 |
| 4,591,370 | 5/1986 | Gazzi et al. | 62/17 |
| 4,710,210 | 12/1987 | Gazzi et al. | 62/17 |
| 4,710,211 | 12/1987 | Gazzi et al. | 62/17 |

FOREIGN PATENT DOCUMENTS

| | | | |
|---|---|---|---|
| 2102696 | 2/1983 | United Kingdom | 55/73 |
| 2102697 | 2/1983 | United Kingdom | 62/17 |

Primary Examiner—Bernard Novick
Attorney, Agent, or Firm—Morgan & Finnegan

[57] ABSTRACT

A cryogenic process for the removal of acidic gases from natural or synthetic gases comprising preliminary cooling of the gas to condense a portion of the acidic gases contained in the gas, and contacting the cooled gas with a mixture of one or more organic selective solvents such as low molecular weight esters, alcohols and ethers and one or more organic compounds such as heptane, fractions of natural gasoline containing hydrocarbons;

monoaromatic compounds;

dimethylethers of polyglycols having the glycolic unit $CH_2-CH-O-$ repeated three to five times;

methoxy- and/or ethoxyalcohols, wherein the alcoholic group is a radical having from 3 to 4 carbon atoms in either linear or branched chain.

42 Claims, 1 Drawing Sheet

CRYOGENIC PROCESS FOR THE REMOVAL OF ACIDIC GASES FROM MIXTURES OF GASES BY SOLVENT

CROSS REFERENCE TO RELATED APPLICATION

This application is a continuation of Ser. No. 06/863,874, filed May 16, 1986 now abandoned.

The present invention relates to a process for the removal of acidic gases, including, hydrogen sulphide and carbon dioxide from mixtures of gases, specifically natural gases or synthesis gases, which contain them, particularly suitable for the processing of gaseous mixtures with even very high concentrations of acidic gases.

To start up the production of gas fields with gases having a high content of acidic gases, or to the purpose of purifying the synthesis gases produced by starting from fuel oil or from coal, treatment processes are presently needed suitable to handle gases with high and very high contents of acidic components, able to yield products with even very strict specification.

The treatment of such gases requires the adoption of mixed cryogenic and solvent-using technologies, so as to combine the advantages of both technologies, a good purification of the gases with acceptable costs being obtained.

The same Applicant has already claimed a process of such a type by the U.S. Pat. No. 4,097,250 granted on June 27, 1979. In such patent application, the purification is reported of a raw gas containing more than 70% of acidic gases, by the combined use of a low-temperature distillation, and of absorption by solvent.

The solvents described are dimethylether polyethyleneglycol and propylene carbonate.

It has been found now a new purification process particularly suitable to the treatment of gases containing high concentrations of acidic gases, based on the use of mixtures of selective solvents particularly suitable to be used in the purification process by cryogenic cycle.

The process of the present invention for the removal of acidic gases from natural gases or from synthesis gases by adsorption and preliminary cooling of the natural gas or of the synthesis gas to the purpose of condensing a portion of the acidic gases contained in the same gas, is characterized in that in it use is made of a solvent and organic compound mixture. The solvent component of this mixture is mixture constituted by low molecular weight alcohols, esters and ethers belonging to the following classes:

Esters of alcohols of general formula $R_1COOR_2$, wherein $R_1$ and $R_2$ are alkyl groups of from 1 to 4 carbon atoms, equal to or different from each other, wherein one or more hydrogen atoms can be substituted by alcoholic groups, such as methyl formate, methyl acetate, ethyl acetate, monoethyleneglycol acetate.

Esters of glycols of general formula:

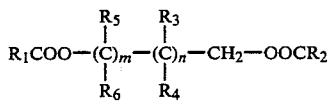

or

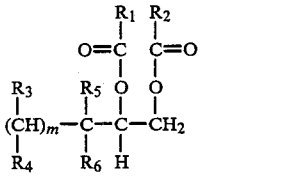

wherein $R_1$ and $R_2$ are alkyl groups having from 1 to 4 carbon atoms, equal to or different from each other, $R_3$, $R_4$, $R_5$, $R_6$, equal to or different from each other, are either alkyl groups containing from 1 to 3 carbon atoms or hydrogen atoms, m and n are integers which can have the value 0 or 1, such as 1,3-propanediol diacetate, 2,2-dimethyl-1,3,-propanediol diacetate, 1,2-propanediol diacetate, monoethyleneglycol diacetate.

Cyclic esters (lactones) of formula

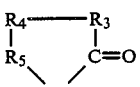

or

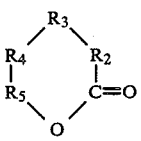

wherein $R_2$, $R_3$, $R_4$, $R_5$, equal to or different from each other, are alkylene groups wherein one or more hydrogen atoms can also be substituted by alkylic, alcoholic or ether groups, such as butyrolactone, caprolactone.

Alcohols of general formula

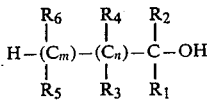

wherein $R_1$, $R_2$, $R_3$, $R_4$, $R_5$, $R_6$, equal to or different from each other, are alkyl groups having from 1 to 3 carbon atoms or hydroxy groups or hydrogen atoms, m and n are integers which can assume the values 0 and 1, such as monoethyleneglycol, diethyleneglycol, 1,2-propanediol, 1,3-propanediol, 1,4-butanediol, methanol, ethanol, propanol, isopropanol, n-butanol, isobutanol, sec-butanol, tert-butanol.

Cyclic ethers such as

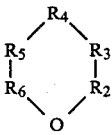

wherein $R_2$, $R_5$, $R_6$, equal to or different from each other, are alkylene groups wherein hydrogen can also be substituted by alkyl or methoxy groups, $R_3$ can be either an oxygen atom or an alkylene group wherein hydrogen can also be substituted by alkyl or methoxy groups, $R_4$ can be either equal to $R_3$ or can be missing in case of a pentaatomic ring, such as tetrahydrofuran, methyltetrahydrofuran, tetrahydropyran, 1,3-dioxolane, 2-methoxy-1,3-dioxolane, 1,4-dioxane.

Ethers of general formula $$R_1-O-CH_2-(R_3)_n-CH_2-O-R_2$$

wherein $R_1$ represents an alkyl group of from 1 to 4 carbon atoms, $R_2$ is either an alkyl group of from 1 to 4 carbon atoms or a hydrogen atom, $R_3$ is either an alkylene group or ($CH_2-O-CH_2$), n is an integer which can have the value 0 or 1, such as 1,2-dimethoxyethane, 1,2-methoxyethoxyethane, dimethoxydiethyleneglycol, monomethoxydiethyleneglycol.

Ethers of general formula $$R_1-O-R_2$$

wherein $R_1$ and $R_2$, either equal to or different from each other, are alkyl groups of from 1 to 4 carbon atoms, wherein one or more hydrogen atoms can be substituted by alcoholic groups such as ethyl ether, propyl ether, 1-methoxyethanol, 1-methoxy-2-propanol, 1-methoxy-3-propanol, ethoxyethanol.

Ester-ethers, compounds containing both the functions, of formula:

$$(R_4-O)_n-R_1-COOR_2 (OR_3)_m$$

wherein $R_3$ and $R_4$, equal to or different from each other, are alkyl groups having from 1 to 4 carbon atoms, $R_2$ is an alkylene or alkyl group having from 1 to 4 carbon atoms, $R_1$ is either equal to $R_2$ or equal to $R_3$, m and n are integers which can have the value 0 or 1, such as methyl 2-methoxyethylacetate or methyl methoxyacetate or ethyl methoxyacetate the organic compound component of the aforementioned solvent and organic compound mixture is made up of one or more organic compounds selected from:

heptane, fractions of natural gasolines containing hydrocarbons having a number of carbon atoms comprised within the range of from 5 to 8;

monoaromatic compounds having a number of paraffinic carbon atoms comprised within the range of from 2 to 4, bound to the benzene ring either separately or as one or more linear or branched side chains;

dimethylethers of polyglycols having the glycolic unit $-CH_2-CH_2-O-$ repeated from once to five times;

methoxy- and/or ethoxyalcohols, wherein the alcoholic group is a radical having from 1 to 4 carbon atoms in either linear or branched chain.

The above reported solvents have a combination of several properties particularly favourable for their use as selective solvents.

They have indeed a high stability under the use conditions, high solvent power for the acidic gases, high selectivity for $H_2S$ and $CO_2$ relatively to hydrocarbons, low molecular weight and low melting point. This last characteristic is essential for the application in a cryogenic process.

In case of treatment of natural gas, after the condensation at low temperature and before the end absorption by solvent, the gas is available at low temperatures, considerably lower than 0° C.

During the end absorption, it is useful to be able to reach temperatures considerably lower than the gas temperature, which are very favourable, because by so doing the absorption power of the solvent and its selectivity increase. The solvents of the process according to the invention show low melting point and are hence particularly suitable for use in a cryogenic process.

The organic compound can be added in proportions comprised within the range of from 0.3 to 40% by weight relatively to the weight of the resulting mixture.

The above described mixture can be used in a two-step system, such steps comprising:

(a) An absorption in tower of the previously cooled and partly condensed gas, to the purpose of reducing its content of acidic gases to the desired value;

(b) a regeneration of the mixture used in the absorption of the acidic gases.

The cooling of the natural gas or of the synthesis gas can take place in a heat exchanger by vapourizing a portion of the acidic gases contained in the $CO_2$-rich mixture in a suitable point of the regeneration.

It is preferable that the acidic gases not condensed after the cooling be at a concentration not higher than 30% by mol in the gas phase, and it is still more preferable that they are comprised within the range of from 15 to 30% by mol.

The cooling of the gas can also take place inside the absorber tower. By means of such a cooling, which causes part of the acidic gases to condense, the distillation tower used in the prior processes is eliminated.

The mixture used for the absorption of the acidic gases in the absorber tower can be regenerated first by means of one or more expansion steps (at maximum, three steps) from which above all the useful components coabsorbed in step a) are recovered, and then by means of one or more further expansion steps (at maximum, four steps), from which mainly the acidic gases are evolved.

The mixture thus regenerated is recycled to the absorber tower.

The regeneration of the mixture must be completed by a distillation tower if in the acidic gases also $H_2S$ is contained, because the specifications as for residual $H_2S$ in the treated gas are much more limitative than for $CO_2$ only; whilst if in the acidic gases only $CO_2$ is contained, using or not using a distillative regeneration tower depends on the maximum allowed $CO_2$ content in the purified gas.

Always in case the regeneration tower is present, a portion of the mixture leaving the expansion steps can be sent to the regeneration tower, whilst the other portion, not completely regenerated, can be recycled to the absorber tower.

The useful components which evolve from the expansions of the solvent rich in acidic gases are compressed, cooled and recycled to the absorber tower.

The expansions of the mixture rich in acidic gases can be carried out in an expansion valve, or, at least partly, in a turbine.

The regeneration by expansion of the mixture rich in acidic gases can be integrated with the heating of the same mixture, in order to promote the removal of the acidic gases by evaporation and recover cooling power to be used in the process.

The expansion steps from which mainly acidic gases evolve can be from 1 to 4, producing streams of acidic gases under progressively lower pressures, of which, one or two can be kept under vacuum, in which case the acidic gases evolved must be compressed again. In some cases, on the contrary, operating under vacuum is not necessary, because the end pressure is a function of the temperature reached and of the purification level desired.

The mainly acidic gases containing streams produced under high pressures can be expanded by means of an expansion valve, or of a turbine, to the delivery pressure, to the purpose of producing work and refrigerating effect.

The absorber tower operates under a pressure comprised within the range of from 20 to 110 kg/cm$^2$ and at a temperature comprised within the range of from $-100°$ C. to 10° C. In case the distillation tower for the regeneration of the mixture is present, said tower shall operate under a pressure comprised within the range of from 0.1 to 5 kg/cm$^2$ and at a head temperature comprised within the range of from $-60°$ C. to 10° C. and at a bottom temperature comprised within the range of from 10° C. to 200° C.

A further possible contrivance consists in adding the mixture to the natural gas or synthesis gas to be purified before said gas to be cooled by heat exchangers or expansion in valve or turbine, to the purpose of preventing $CO_2$ from crystallizing.

The absorbing mixture of absorber tower can be drawn from an intermediate point of the same absorber tower, cooled by using at least a portion of the residual cooling power of the gas processed and/or by using at least a portion of the residual cooling power of the acidic gases, and fed to the tower immediately under the drawing point.

The exhausted mixture leaving the absorber tower can be mixed to the natural gas or synthesis gas and cooled to the purpose of carrying out a preliminary absorption and discharging the absorber.

At last, a further contrivance consists in mixing at least once the regenerated mixture with the gas outcoming from the absorber tower. The mixture thus formed is then cooled to the purpose of separating the regenerated mixture from the same gas.

The mixing or the mixings between the gas outcoming from the absorber tower and the absorption mixture are preferably carried out in a mixer by feeding such streams in countercurrent to each other. Said mixings are preferably two. In case the gas outcoming from the tower undergoes two mixings, such mixings can be carried out as follows: first, a mixing of the treated gas with the regenerated mixture takes place, and then to said mixing a cooling and a separation is carried out of the mixture obtained, thus separating from the gas the regenerated mixture, which is in its turn mixed in a second mixing step with the gas leaving the absorber tower, to which second mixing step a cooling and a separation follows of the mixture obtained in said second mixing, from the gas the regenerated mixture being separated, which is fed to the absorber tower.

The two coolings following the two mixings can be carried out at the same temperature or at different temperatures, preferably within a temperature range between $-50°$ and $-100°$ C.

Figure 2:
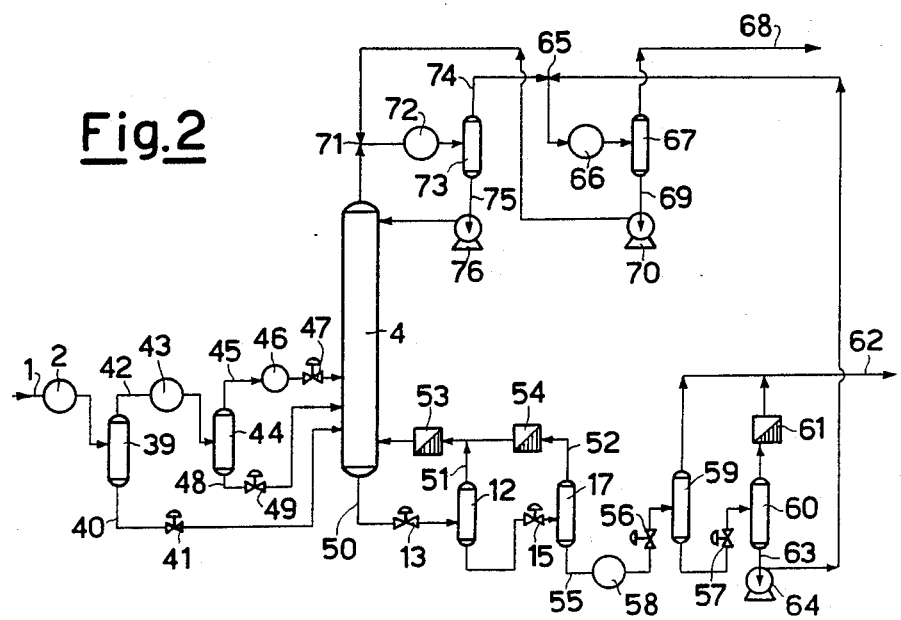

The invention shall be now better described by referring to the flow sheet of attached FIGS. 1 and 2 which show preferred forms of embodiment, which however must not be considered as limitative of the same invention.

Referring to FIG. 1, the raw gas is supplied to the plant by the piping 1, is cooled in 2 and is expanded by the valve 3, and is washed in countercurrent flow by the absorber mixture in the absorber 4 to the purpose of removing the acidic gas. The gas leaving the absorber 4 is mixed with the mixture completely purified and cooled in the heat exchanger 5, is separated from the mixture in 6 and sent to the recovery of the refrigerating power in the heat exchangers 7 and 8, and is then supplied to the network by means of the piping 9. The cooled mixture separated from the gas in 6 is pumped into the absorber 4 by the pump 10. Further absorber mixture, not completely purified, is introduced into the absorber at an intermediate level. In order to reduce the average absorption temperature, the absorber mixture is extracted from an intermediate tray of the absorber, pumped in 11 and cooled in 7 by the processed gas.

The mixture rich in acidic gases leaving the absorber 4 is regenerated by expansion. It is fed to the separator 12, through the valve 13, wherein a methane-rich gas evolves, which is recycled to the absorber 4 by the compressor 14, after cooling by the treated gas in 8.

The mixture outcoming from 12 is expanded by the valve 15, is heated in 16 and sent to the separator 17, from which the acidic gases evolve; they are heated in 18 and in 19 and are discharged from the plant. The mixture outcoming from 17 is expanded under vacuum by means of the valve 20, is heated in the heat exchanger 21 and is then sent to the separator 22, from which the acidic gases evolve, which are compressed to nearly atmospheric pressure in the compressor 23 and are discharged from the plant.

A portion of the mixture outcoming from 22, not yet completely purified, is sent by the pump 24 and through the valve 25 to the absorber 4 at an intermediate level (26).

The residual portion of the mixture is fed by the pump 27 and through the valve 28 to the regeneration tower 29 after having been heated in 30.

The mixture is regenerated from the acidic gases in the regenerating tower 29, equipped with condenser 31, reflux accumulator 32, reflux pumps 33, reboiler 34; this latter is heated by a whatever heat source.

The acidic gases outcoming from 32 are combined with those outcoming from the exchangers 18 and 19 and with those outcoming from the compressor 23; they are then removed by the piping 35.

The regenerated mixture is cooled by outer refrigerating means (either air or water, and/or a suitable refrigerating cycle) in 36 and by the mixture to be regenerated in 30 and, by means of the pump 37, is sent to the refrigerator 5 after having been cooled in the heat exchanger 38.

In FIG. 2 a flow sheet is schematically shown, in which two mixings are provided between the regenerated mixture and the gas outcoming from the absorber tower.

The raw gas is supplied to the plant by the piping 1, is cooled and partly condensed in 2, is then fed to the separator 39, the liquid 40 which, through the valve 41, is then fed to the absorber tower 4, being separated from the not condensed gas 42. The not condensed gas 42 is cooled and partly condensed in 43 and sent to the separator 44, from which the gas 45 not condensed in 43 evolves, which is fed, after being cooled in 46, to the absorber tower 4 through the valve 47, whilst the liquid 48 is fed in its turn through the valve 49 to the absorber tower 4.

In the exchangers 2, 43 and 46, the heat exchange can be carried out by using the refrigerating power of the process streams.

From the bottom of the absorber tower 4 a liquid 50 rich in acidic gases, which is regenerated by expansion, is obtained.

It is expanded in two steps by means of the valves 13 and 15 in the separators 12 and 17, from which the vapours 51 and 52, essentially constituted by methane and carbon dioxide, are collected and recycled to the tower 4 after being compressed in 53 and 54.

From the bottom of the separator 17 a liquid 55 is obtained, which is essentially constituted by the mixture and by the separated $CO_2$, this latter being vapourized by expansion by the valves 56 and 57 and heating in the heat exchange unit 58. Said heat exchange unit has been represented for simpleness' sake as one single exchanger, but in reality it supplies the cooling power necessary to the process (for example, in the heat exchangers 2, 43, 46).

Vapourized $CO_2$ is separated from the mixture in the separators 59 and 60, the first one being under a slight over-pressure, the second under vacuum, maintained by the vacuum pump 61, and is discharged from the plant in 62.

The regenerated mixture 63 outcoming from the bottom of the separator 60 is pumped by the pump 64 and mixed in 65 with the gas outcoming from the absorber tower. The mixture obtained is cooled in 66 and separated in 67, the processed gas 68 being separated from the absorber mixture 69.

The mixture 69, after being pumped in 70, is mixed in 71 with the gas outcoming from the absorber tower 4; the mixture obtained is cooled in 72 and separated in 73, the treated gas 74, which is subsequently mixed in 65 with the regenerated mixture 69, being separated from the solvent 75, which is pumped by the pump 76 to the absorber tower 4.

We claim:

1. A cryogenic process for the removal of those acidic gases found in feedstock gases selected from the group consisting of natural gases and synthesis gases, the acidic gases being removed from the feedstock gases by the steps comprising:
   (a) cryogenically cooling the natural or synthesis gas from which the acidic gases are to be removed; and
   (b) contacting the cooled natural or synthesis gas with a mixture of at least one selective organic solvent and at least one organic compound, the selective organic solvent being selected from the group consisting of low molecular weight esters, low molecular weight alcohols, and low molecular weight ethers, the organic compound being selected from the group consisting of heptane, fractions of natural gasolines containing hydrocarbons, dimethylethers of polyglycols having three to five repeating glycolic units, methoxyalcohols, said alcohols have 3 to 4 carbon atoms in the alcohol unit, ethoxy alcohols having 3 to 4 carbon atoms in the alcohol unit, and monoaromatic compounds, in order to absorb acidic gases and to sufficiently reduce the acidic gas content of the natural or synthesis gas.

2. A process according to claim 1, wherein the ester is of alcohols of general formula $R_1COOR_2$, wherein $R_1$ and $R_2$ are alkyl groups of from 1 to 4 carbon atoms, either same as or different from each other, wherein one or more hydrogen atoms can be substituted by alcoholic groups.

3. A process according to claim 1, wherein the ester is of glycol of general formula

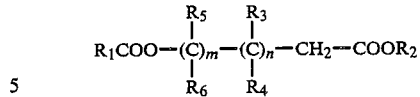

or

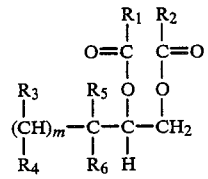

wherein $R_1$ and $R_2$, either same as or different from each other, are alkyl groups having from 1 to 3 carbon atoms, $R_3$, $R_4$, $R_5$, $R_6$, either same as or different from each other, are either alkyl groups containing from 1 to 3 carbon atoms or hydrogen atoms, and m and n are integers which can have the value 0 or 1.

4. A process according to claim 1, wherein the alcohol is of general formula

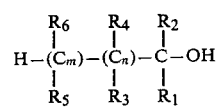

wherein $R_1$, $R_2$, $R_3$, $R_4$, $R_5$, $R_6$, either same as or different from each other, are alkyl groups having from 1 to 3 carbon atoms or hydroxy groups or hydrogen atoms, and m and n are integers equal to 0 or 1.

5. A process according to claim 1, wherein the ether is of general formula $$R_1-O-CH_2-(R_3)_n-CH_2-O-R_2$$

wherein $R_1$ is an alkyl group of from 1 to 4 carbon atoms, $R_2$ is either an alkyl group of from 1 to 4 carbon atoms or a hydrogen atoms, $R_3$ is either an alkylene group or ($CH_2-O-CH_2$), and n is an integer equal to 0 to 1.

6. A process according to claim 1, wherein the ether is of general formula $$R_1-O-R_2$$

wherein $R_1$ and $R_2$, either same as or different from each other, are alkyl groups of from 1 to 4 carbon atoms, wherein one or more hydrogen atoms can be substituted by alcoholic groups.

7. A process according to claim 1, wherein the ether is an ester-ether compound of formula $$(R_4-O)_n-R_1-COOR_2(OR_3)_m$$

wherein $R_3$ and $R_4$, either same as or different from each other, are alkyl groups having from 1 to 4 carbon atoms, $R_2$ is an alkylene group having from 1 to 4 carbon atoms, $R_1$ is either same as $R_2$ or same as $R_3$, and m and n are integers equal to 0 to 1.

8. A process according to claim 1, wherein the fractions of natural gasolines containing hydrocarbons have from 5 to 8 carbon atoms.

9. A process according to claim 1, wherein the monoaromatic compounds have from 2 to 4 paraffinic carbon atoms bound to the benzene ring either separately or as one or more linear or branched side chains.

10. A process according to claim 1, wherein the ester is a cyclic ester of formula

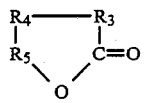

or

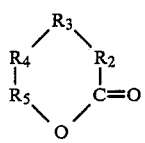

wherein $R_2$, $R_3$, $R_4$, $R_5$, either same as or different from each other, are alkylene groups wherein one or more hydrogen atoms can also be substituted by alkylic, alcoholic or ether groups.

11. A process according to claim 1, wherein the ether is a cyclic ether of formula

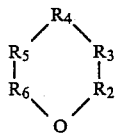

wherein $R_2$, $R_5$, $R_6$, either same as or different from each other, are alkylene groups wherein hydrogen can also be substituted by alkyl or methoxy groups, $R_3$ is either an oxygen atom or an alkylene group wherein hydrogen can also be substituted by alkyl or methoxy groups, $R_4$ is either same as $R_3$ or can be missing in the case of a pentaatomic ring.

12. A cryogenic process for the removal of those acidic gases found in a feedstock of natural or synthesis gases, the steps comprising
   (a) cryogenically cooling the feedstock gas to condense a portion of those acidic gases found in the feedstock gas, these acidic gases to be removed from the feedstock; and
   (b) contacting the cooled feedstock gas with a mixture of at least one solvent and at least one organic compound to absorb acidic gases and to sufficiently reduce the acidic gas content of the feedstock gas, the at least one solvent being selected from the group consisting of low molecular weight esters, alcohols and ethers of the following classes:
   esters of glycols of general formula

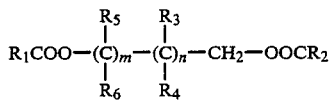

or

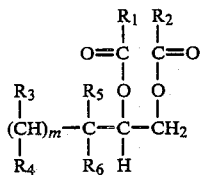

wherein $R_1$ and $R_2$ are alkyl groups having from 1 to 3 carbon atoms, equal to or different from each other, $R_3$, $R_4$, $R_5$, $R_6$, equal to or different from each other, are either alkyl groups containing from 1 to 3 carbon atoms or hydrogen atoms, m and n are integers which can have the value 0 or 1;
cyclic esters of formula

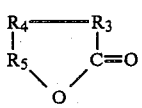

or

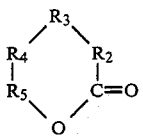

wherein $R_2$, $R_3$, $R_4$, $R_5$, equal to or different from each other, are alkylene groups wherein one or more hydrogen atoms can also be substituted by alkylic, alcoholic or ether groups;
alcohols of general formula

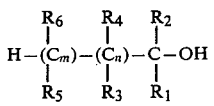

wherein $R_1$, $R_2$, $R_3$, $R_4$, $R_5$, $R_6$, equal to or different from each other, are alkyl groups having from 1 to 3 carbon atoms or hydroxy goups or hydrogen atoms, m and n are integers which can assume the values 0 and 1;
cyclic ethers such as

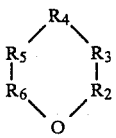

wherein $R_2$, $R_5$, $R_6$, equal to or different from each other, are alkylene groups wherein hydrogen can also be substituted by alkyl or methoxy groups, $R_3$ is either an oxygen atom or alkylene group wherein hydrogen can also be substituted by alkyl or methoxy groups, $R_4$ is either equal to $R_3$ or can be missing in case of a pentaatomic ring;
ethers of general formula

wherein $R_1$ is an alkyl group of from 1 to 4 carbon atoms, $R_2$ is either an alkyl group of from 1 to 4 carbon atoms or a hydrogen atom, $R_3$ is either an alkylene group or $(CH_2-O-CH_2)$, n is an integer which can have the value 0 or 1; ethers of general formula $$R_1-O-R_2$$

wherein $R_1$ and $R_2$, either equal to or different from each other, are alkyl groups of from 1 to 4 carbon atoms, wherein one or more hydrogen atoms can be substituted by alcoholic groups;
ester-ethers, compounds containing both the functions of formula:

$$(R_4-O)_n-R_1-COOR_2(OR_3)_m$$

wherein $R_3$ and $R_4$, equal to or different from each other, are alkyl groups having from 1 to 4 carbon atoms, $R_2$ is an alkylene group having from 1 to 4 carbon atoms, $R_1$ is either equal to $R_2$ or equal to $R_3$, m and n are integers which can have the value 0 or 1,
and the at least one organic compound being selected from the group consisting of:
heptane,
fractions of natural gasolines containing hydrocarbons having a number of carbon atoms comprised within the range of from 5 to 8;
monoaromatic compounds having a number of paraffinic carbon atoms comprised within the range of from 2 to 4, bound to the benzene ring either separately or as one or more linear or branched side chains;
dimethylethers of polyglycols having the glycolic unit $-CH_2-CH-O-$ repeated from three to five times;
methoxy- and/or ethoxyalcohols, wherein the alcoholic group is a radical having 3 to 4 carbon atoms in either linear or branched chains,
wherein said step (b) is constituted (1) reducing the acidic gas content of the gas previously cooled and partly condensed in (a) by carrying out an absorption in tower of the gas previously cooled and partly condensed in (a), said absorber tower operating under a pressure within the range of 20 to 110 Kg/cm² and at a temperature within the range of $-100°$ C. to $10°$ C., and (2) regenerating the mixture used in the absorption of the acidic gases.

13. Process according to claim 12, wherein to the natural gas or to the synthesis gas, before being cooled and sent to the absorption, solvent is added to the purpose of preventing $CO_2$ from crystallizing.

14. Process according to claim 12, wherein the exhausted mixture outcoming from the absorber tower is mixed with the natural gas or with the synthesis gas and is subsequently cooled.

15. Process according to claim 12, wherein the organic compound is added in proportions comprised within the range of from 0.3 to 40% by weight of the resulting mixture.

16. Process according to claim 12, wherein the selective solvent is either methyl formate or methyl acetate or ethyl acetate.

17. Process according to claim 12, wherein the selective solvent is tetrahydropyran or 1,3-dioxolane or 1,4-dioxane or tetrahydrofuran or methyltetrahydrofuran or 2- methoxy-1,3-dioxolane.

18. Process according to claim 12, wherein the selective solvent is 1,3-propanediol diacetate or 2,2-dimethyl-1,3-propanediol diacetate or 1,2-propanediol diacetate or monoethyleneglycol diacetate.

19. Process according to claim 12, wherein the selective solvent is 1,2-dimethoxyethane or 1,2-methoxyethoxyethane or dimethoxydiethyleneglycol or monomethoxydiethyleneglycol.

20. Process according to claim 12, wherein the selective solvent is methyl 2-methoxyethylacetate or methyl methoxyacetate or ethyl methoxy acetate.

21. Process according to claim 12, wherein the selective solvent is methoxyethanol, 1-methoxy-2-propanol, 1-methoxy-3-propanol, monoethoxydiethyleneglycol or ethoxyethanol, ethyl ether or propyl ether.

22. Process according to claim 12, wherein the selective solvent is monoethyleneglycol, diethyleneglycol, 1,2-propanediol, 1,3-propanediol, 1,4-butanediol, methanol, ethanol, propanol, isopropanol, n-butanol, isobutanol, sec-butanol or tert.butanol.

23. A process as in claim 12 wherein at least one of said acidic gases to be removed is selected from the group $CO_2$ and $H_2S$.

24. Process according to claim 12, wherein the mixture used for the absorption of the acidic gases in the absorber tower is regenerated first by means of one or more expansion steps in which above all the useful components co-absorbed in step (a) are recovered, then by means of one or more further expansion steps from which above all acidic gases evolve, the regenerated mixture being subsequently recycled to the absorption column.

25. Process according to claim 24, wherein the expansion steps from which above all the useful components are recovered can be from 1 to 3.

26. Process according to claim 24, wherein the regeneration by expansion of the mixture rich in acidic gases is integrated by the heating of the same mixture to the purpose of favouring the removal of the acidic gases by vapourization and recovering refrigerating power to be used in the process.

27. Process according to claim 24, wherein the useful components which evolve from the expansion or from the expansions of the mixture rich in acidic gases are compressed, cooled and recycled to the absorber column.

28. Process according to claim 24, wherein the regeneration of the mixture is completed by a distillation tower.

29. Process according to claim 28, wherein the distillation tower for the regeneration of the mixture operates under a pressure comprised within the range of from 0.1 to 5 kg/cm², at a head temperature of from $-60°$ C. to $10°$ C. and at a bottom temperature of from $10°$ C. to $200°$ C.

30. Process according to claims 24 or 28 wherein a portion of the mixture outcoming from the expansion steps is fed to the distillatin tower, whilst the residual portion is recycled to the absorption tower.

31. Process according to claims 24 or 28, wherein the expansions of the mixture rich in acidic gases take place in expansion valve or, at least partly, in turbine.

32. Process according to claim 28, wherein the expansion steps from which mainly acidic gases evolve can be from 1 to 4, producing streams under progressively decreasing pressures.

33. Process according to claim 32, wherein 1 or 2 expansion steps are maintained under vacuum.

34. Process according to claims 24 or 32, wherein the stream or the streams mainly containing acidic gases, produced under high pressure is/are expanded in turbine to the delivery pressure, to the purpose of producing work and refrigerating effect.

35. Process according to claim 12, wherein the mixture of the absorber tower as of item (a), is drawn from an intermediate point of the same absorber tower, is cooled and reintroduced into the tower immediately under the drawing point.

36. Process according to claims 12 or 35, wherein at least a portion of the intermediate cooling of the mixture is carried out by using at least a portion of the residual refrigerating power of the processed gas.

37. Process according to claims 12 or 35, wherein at least a part of the intermediate cooling of the mixture is carried out by using at least a part of residual refrigerating power of $CO_2$.

38. Process according to claim 12, wherein the regenerated mixture is mixed at least once with the gas outcoming from the absorber column, the mixture thus formed being then cooled the regenerated mixture being thus separated from the same gas.

39. Process according to claim 38, wherein the mixings between the gas outcoming from the absorption column and the regenerated mixture are carried out by feeding said gas and said mixture to a mixer in countercurrent to each other.

40. Process according to claim 38, wherein the mixings between the gas outcoming from the absorber tower and the regenerated mixture are in a number of at least two.

41. Process according to claim 40, wherein the first mixing is carried out by mixing the treated gas with the regenerated mixture, to said mixing a cooling and a separation of the mixture obtained follows, the regenerated mixture being separated from the gas, which regenerated mixture is mixed in its turn in a second mixing with the gas outcoming from the absorber tower, to which second mixing a cooling and a separation follows of the mixture obtained by separating from the gas, which is sent to the first mixing, the regenerated mixture, which is fed to the absorber tower.

42. Process according to claim 41, wherein the two coolings following the two mixings are carried out at the same temperature or at different temperatures comprised within a temperature range of from $-50°$ C. to $-100°$ C.

* * * * *